(12) United States Patent
Septien Prieto (10) Patent No.: US 11,439,130 B2
(45) Date of Patent: Sep. 13, 2022

(54) FEEDER FOR POULTRY WITH TWO-WAY ROTATION

(71) Applicant: Francisco Javier Septien Prieto, Guanajuato (MX)

(72) Inventor: Francisco Javier Septien Prieto, Guanajuato (MX)

( * ) Notice: Subject to any disclaimer, the term of this patent is extended or adjusted under 35 U.S.C. 154(b) by 407 days.

(21) Appl. No.: 16/476,999

(22) PCT Filed: Dec. 19, 2018

(86) PCT No.: PCT/MX2018/000162
§ 371 (c)(1),
(2) Date: Jul. 10, 2019

(87) PCT Pub. No.: WO2020/055224
PCT Pub. Date: Mar. 19, 2020

(65) Prior Publication Data
US 2021/0352875 A1 Nov. 18, 2021

(30) Foreign Application Priority Data
Sep. 10, 2018 (MX) .................... MX/a/2018/010957

(51) Int. Cl.
*A01K 39/01* (2006.01)
(52) U.S. Cl.
CPC .................................. *A01K 39/01* (2013.01)

(58) Field of Classification Search
CPC .... A01K 39/01; A01K 39/012; A01K 39/014; A01K 39/0125
See application file for complete search history.

(56) References Cited

U.S. PATENT DOCUMENTS

D786,511 S * 5/2017 Septien Prieto ............. D30/121
9,713,320 B2 * 7/2017 Septien Prieto ... A01K 39/0125
2008/0156269 A1 * 7/2008 Greenwood ....... A01K 39/0106
119/51.01

FOREIGN PATENT DOCUMENTS

WO    WO-0049857 A1 *  8/2000  ......... A01K 39/0125

* cited by examiner

*Primary Examiner* — Kathleen I Alker
*Assistant Examiner* — Nicole Paige Maccrate
(74) *Attorney, Agent, or Firm* — Hoglund & Pamias, PSC; Roberto J Rios (57) ABSTRACT

A poultry feeder with double directional of rotation is provided that balances the weight of the feeders in the feeding tube, reduces colocation time and rework. The poultry feeder with double directional of rotation can be placed in a resting or washing position in both directions without interfering with the anti-perching cable and can be completely internally washed without being disassembled. The hopper and the plate are rigidly coupled and do not uncouple during pressure washing and the central cone of the plate has elevations at the ends to allow a better distribution of the food. The curved tongue prevents the accumulation of food by leaving a minimum space between it and the tube.

18 Claims, 9 Drawing Sheets

FEEDER FOR POULTRY WITH TWO-WAY ROTATION

TECHNICAL FIELD

The present invention refers to a feeder for birds in poultry farms, specifically refers to a feeder mainly for small birds or in primary stages of its growth, which has the ability to join to an automatic feeding system and rotate both in clockwise and anti-clockwise to position itself above the head of the birds in its non-use condition, and which can be washed and disinfected completely both internally and externally without being disarmed.

BACKGROUND OF THE INVENTION

As well known in the prior art, commercial poultry farming is worldwide an activity of greater relevance, since it is responsible for the poultry production for productive purposes. Generally, it may be classified into two types of production places: hi-tech production places, dependent on various automated systems and traditional or non-technified places that depend to a large extent on manual equipment that requires the man hand.

The hi-tech places are the most world widely used, with 75% of the commercial exploitation worldwide, producing more than fifty billion birds annually to produce meat. The hi-tech production places include an automation in all their needed systems for an intensive production, such as: feeder systems, coupling drinking systems, feeder and drinking suspension systems, air-conditioning systems, among others. In contrast, the traditional or non-sophisticated locals are rudimentary and conventional, using manual equipment such as hanging feeders and bell-type hanging drinking devices, manual energized heaters, manual curtains, all thereof are totally dependent on human supervision at all times for their proper functioning.

In this sense, as known in prior art, poultry production comprises between three to five stages. The production of birds to produce meat generally ends between the fifth and ninth week of age, depending on the specific type of bird that the market demands. The most important and critical stages of a bird's life are the initiation and growth stages (on which the present invention is focused), which includes the first three weeks of life, being the first two weeks as the most important and representing up to 35% of the bird's life, which is when the newly born birds come out of the incubation location and arrive at the production location where they have to learn to quickly eat and drink, and because of its body and immunological immaturity, there is a need to provide a strict environmental and health control, which, otherwise would result in a significant delay in their development and increased bird mortality.

Therefore, the most important supply in this industry is the bird food, which is provided in bulk, which represents 75% of the total production cost, being the most important factor to rationing and that any action that is intended to maximize the feeding utilization will result in a greater productive efficiency by increasing the economic benefit to the poultry producer.

According to the previous, the "on-floor feeding system" is the traditional way to feed the chicken in their first few weeks of life which includes supplying food to the floor without any restriction, presenting a number of disadvantages and problems, such as is the high risk of contamination (and therefore the spread of diseases), waste of food, low feed intake, low productive efficiency, and high production costs, impacting the efficiency of the poultry producer. Thus, it has been observed that the "on-floor feeding system" is an important factor for the transmission of serious infections to humans, by which it has taken a relevant interest as a public health problem.

In spite of the fact that hi-tech production places have automatic feeding systems, through automatic type feeders, these are not designed to properly feed the birds during their first few weeks of age so they cause a lot of the above-mentioned problems, such as food contamination and low productivity. To improve the effectiveness of the automatic feeders, there are inserted feeding systems in the traditional on-floor systems that involve the use of plastic trays/cardboard, carpets of paper strips r, or simply to supply food to the birds in the first days of life. These traditional auxiliary feeding sources are used only the first seven days of life, because the waste of food increases proportionally with the age of the birds, as well as the food contamination problems, and increased risk of contamination between birds.

In light of the above, it has been found the automatic type feeders which are usually of rounded shape, although there are feeders of different shapes and sizes, oval, triangular, hexagonal, square and rectangular, wherein the common problem is that the automatic feeders occupy a large space inside the production location by which a smaller number of birds per square meter is placed, reducing productivity. In addition, feeders having oval corners or edges, cause a great conflict for the birds at the time of feeding, since birds dispute and fight for the same eating space, thus the food consumption is significantly lower and therefore the production results are not satisfactory.

In the state of the art, there are several documents relating to automatic feeders, and within the components of these feeders, a relevant part is the connection devices between the feeder and the food supply tube to the feeder, the shape of the tray, and the search for a better distribution of birds and food in order to increase the productivity of bird production systems.

There is, for example, the document ES 238,056, which is entitled "Improved Dosing Hopper, for Feeding Birds" which is a utility model, although it is found in the state of the art of the present invention, the configuration and feeding form of the product to the hopper, differ significantly from those used in the present invention. Also it is known the ES2,117,148 patent, entitled "Device for Feeding Farmyard Poultry". This device has a circular shape and the product feeding is also performed by an upper duct, but not using a system such as the one described in the present invention on the basis of a choke. The patent ES2,172,428, entitled "Feeder for Farmyard Poultry" is of connectable type to a horizontal tubular conduit (4), such as that of the present invention, which can be placed in two positions, the feeding and the cleaning, wherein said '148 patent requires the rising of the horizontal feeding tube, which implies that the feeding is performed at the same time in each feeder regardless of whether it is required or not.

In the U.S. Pat. No. 7,581,512, mentions the importance of the tray on which the food is dropped and shows tray designs indicating that the best arrangement is the one shown and includes an elongated shape (oval) or in the shape of two circles that intersect (see summary). As specified in this patent '512, and in the rest of the documents, the configuration of the tray that receives the food and the separation system of the birds at the time of eating are important factors for which, through time, is seeking an ideal way to provide an adequate distribution of food from the horizontal tube.

Finally, there is the U.S. Pat. No. 9,713,320, which refers to a feeder with a rounded rectangular shape, which although partially solves the aforementioned problems, also has disadvantages or problems when used in technified production facilities, since the feeder disclosed by this document, can only turn in one direction, which causes that, when the feeders are not used, and these are placed on the head of the animals in the storage or washing position, the weight of said feeders cause the tube that distributes the food to turn, and the distribution openings of the food become misaligned from the feed receiving opening of the feeders, causing rework to realign said openings. Likewise, to achieve an adequate washing of the hopper, it is required to disassemble the hopper of the plate, which consumes a lot of time and money. Likewise, above the head of the birds in the resting or washing position, the feeder collides with the anti-perch cable that prevents birds from getting into the feeding tubes, which causes the cable to have to be retired which favors the perching of the birds and therefore can damage the feeding tubes.

Therefore, in the state of the art, there is not a poultry feeder, which can be connected to a horizontal tubular feed pipe and can rotate both clockwise and counter-clockwise when it is above the head of the birds for its rest, and which can be washed in an optimal way without the need to disassemble hopper and plate.

OBJECTS OF THE INVENTION

It is therefore an object of the present invention to provide a poultry feeder with double sense of rotation which allows balancing the weight of the feeders in the feeding tube.

Another object of the present invention is to provide a poultry feeder with double sense of rotation that reduces colocation time and rework.

A further object of the present invention is to provide a poultry feeder with double sense of rotation that can be placed in a resting or washing position in both senses without interfering with the anti-perching cable.

Still another object of the present invention is to provide a poultry feeder with double sense of rotation which can be completely internally washed without being disassembled.

A further object of the present invention is to provide a poultry feeder with a double direction of rotation where the hopper and the plate are rigidly coupled and do not uncouple during pressure washing.

Still another object of the present invention is to provide a poultry feeder with double sense of rotation wherein the central cone of the plate has elevations at the ends to allow a better distribution of the food.

Still another object of the present invention is to provide a poultry feeder with double sense of rotation wherein the curved tongue prevents the accumulation of food by leaving a minimum space between it and the tube.

BRIEF DESCRIPTION OF THE INVENTION

These and other objects are reached through a poultry feeder with double sense of rotation, which is conformed by a substantially rounded rectangular plate with an upper edge forming a coupling slot; a hopper having a plurality of lower fins with an edge at the tip and which are configured to be inserted into the coupling slot, a plurality of side and upper openings to allow internal washing, and an upper hole with lateral reinforcements; a circular flange having lateral ends coupling releasably and in its lower part a substantially square hollow throat with projections or stops at its lower end, wherein said flange and throat are divided into two parts to be inserted into said upper orifice said hopper and are held therein by said stops, and wherein said flange comprises at its lower part right and left reinforcing ears having a semicircular cutout; and a substantially cylindrical clamp conformed by two upper and lower halves in the shape of a half-round, wherein each of said upper and lower halves is divided into three sections front, central and rear, by peripheral ridges, wherein the lower half comprises an orifice for receiving food in the central section; and a T-shaped curved tongue sliding through said peripheral ridges and over a groove in the outer surface of said lower half, wherein said tongue comprises adjacent to its rear end a through hole, and at its front end a tongue gripping media for better handling thereof, wherein said tongue has the function of opening and closing the passage of food through the food receiving orifice, said upper half comprises in its front section retaining and coupling means of securing element, wherein when the feeder is rotated, either clockwise or counter-clockwise, to be placed in its resting or washing position at approximately 160° or 70°, depending on the direction in which it is turned, said feeder is maintained and secured in said position by means of said securing element, by rotating the flange on the central section of the clamp, so that said the retaining media coincides with the respective semicircular cutout of the right or left reinforcing ear of said flange according to the sense in which the feeder is rotated and inserting said securing means through said retaining means and semicircular cutout.

DETAILED DESCRIPTION OF THE INVENTION

Figure 1:
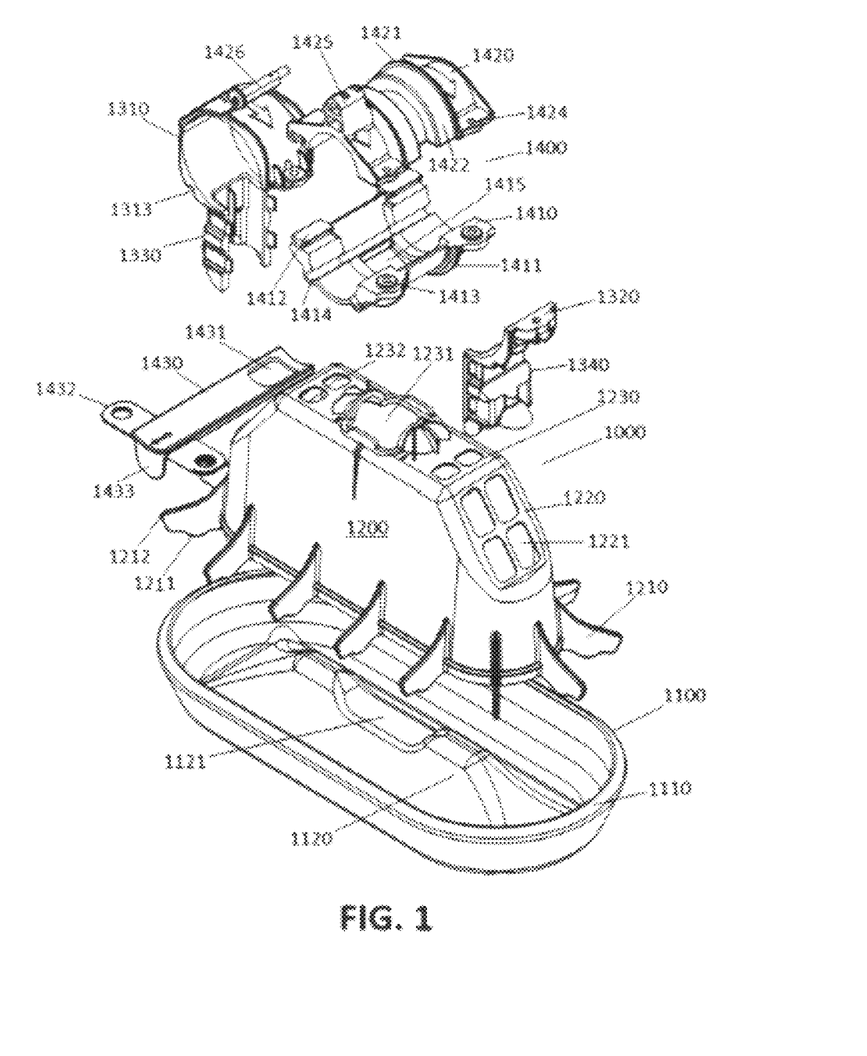
FIG. 1 is a perspective view of the poultry feeder with double sense of rotation of the present invention.
Figure 2:
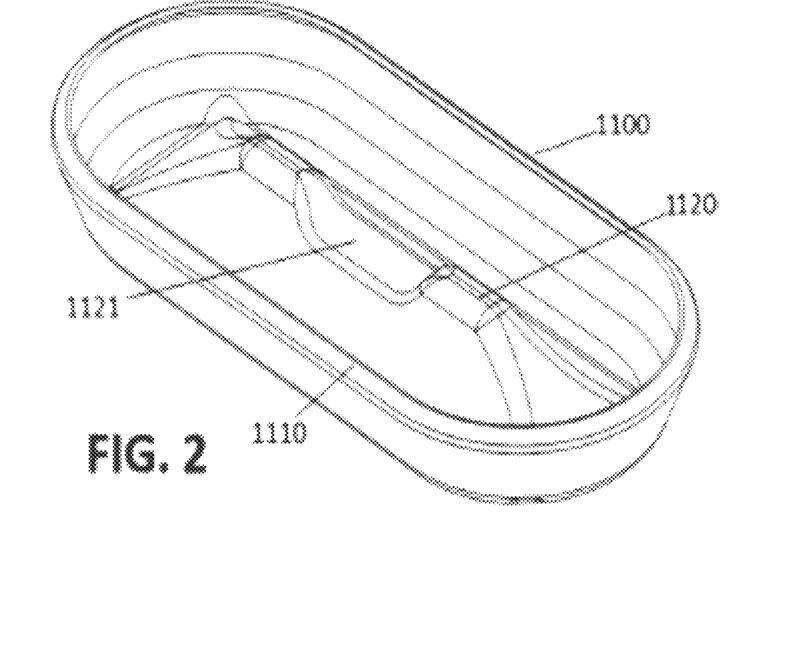
FIG. 2 is a perspective view of the food receiving plate of poultry feeder with double sense of rotation of the present invention.
Figure 3:
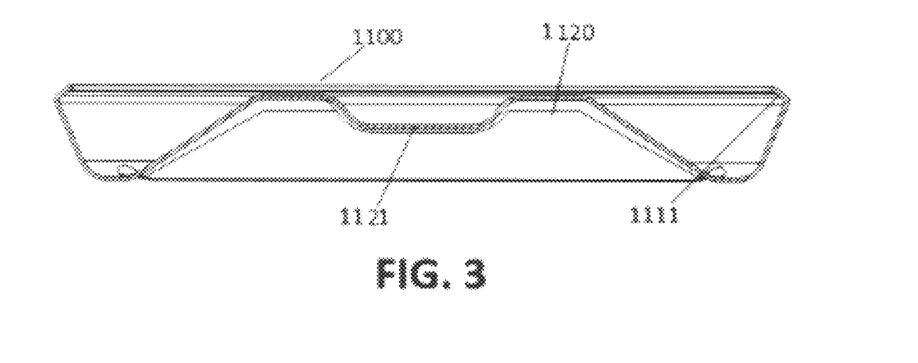
FIG. 3 is a cross sectional view of the food receiving plate of FIG. 1.

With reference to FIG. 1, the poultry feeder with double sense of rotation numbered generally at 1000 is shown. Said feeder 1000 is formed mainly by a food receiving plate 1100; a hopper 1200; a positioning flange 1300 and a holding clamp 1400. As shown in FIGS. 1 to 3, said food receiving plate 1100 has a rounded rectangular shape or a rectangular shape with its corners rounded and a substantially conical peripheral wall, integrally joined to a bottom wall. Said plate 1100 comprises at the upper end of its peripheral wall a slightly curved peripherally ridge 1110, which forms an internal coupling groove 1111. Said plate further comprises in its interior a central longitudinal hump 1120 which comprises a depression 1121 in the center of the same with a flat surface, said depression 1121 has the function of uniformly distributing the food throughout the plate, which falls thereon from the hopper 1200.

Figure 4:
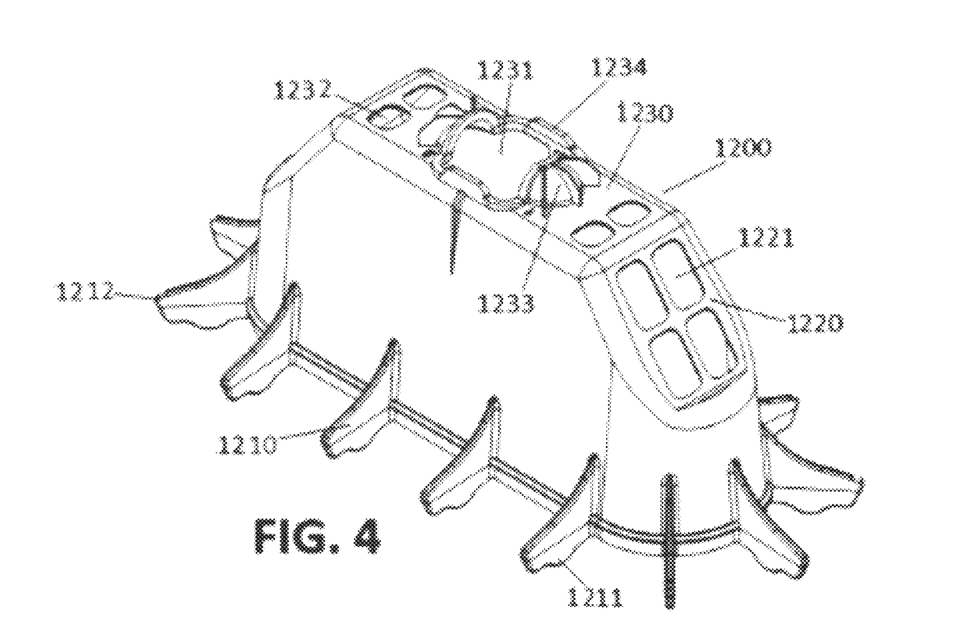
FIG. 4 is a perspective view of the hopper of the poultry feeder with double sense of rotation of the present invention.
Figure 5:
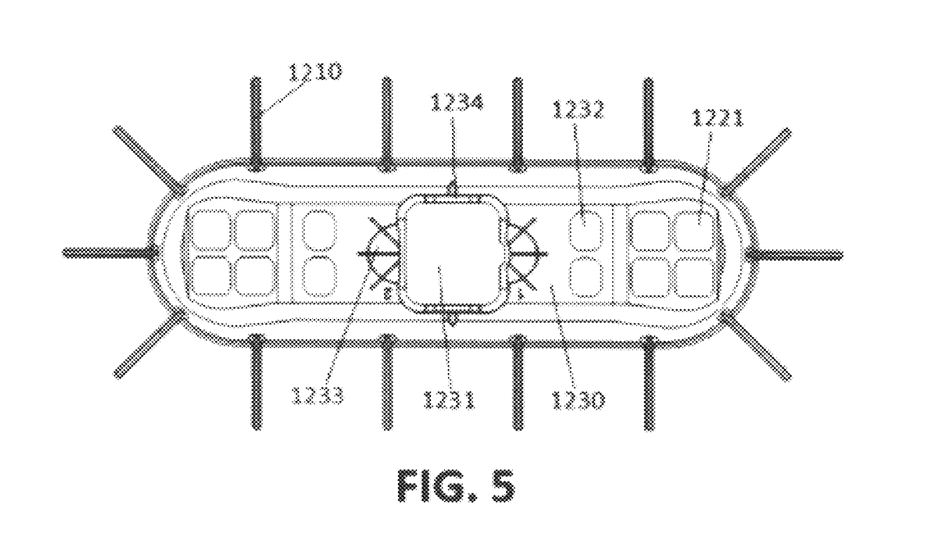
FIG. 5 is a top view of the hopper of FIG. 4.
Figure 5A:
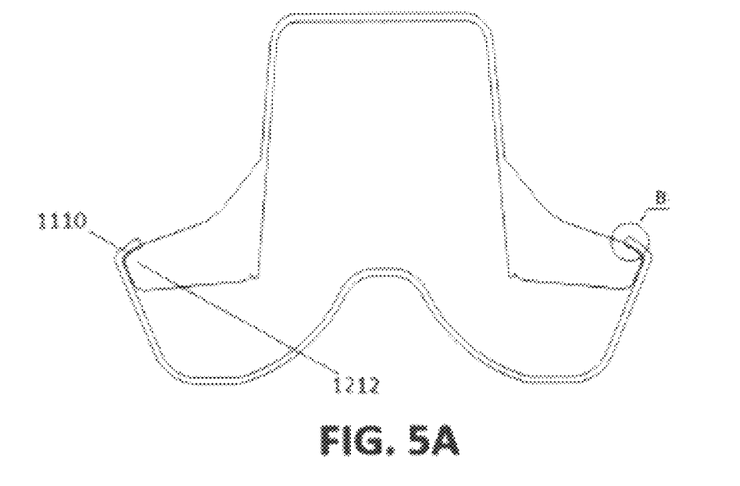
FIG. 5A is a cross sectional view of the hopper and plate of the coupling of the poultry feeder with double sense of rotation of the present invention.
Figure 5B:
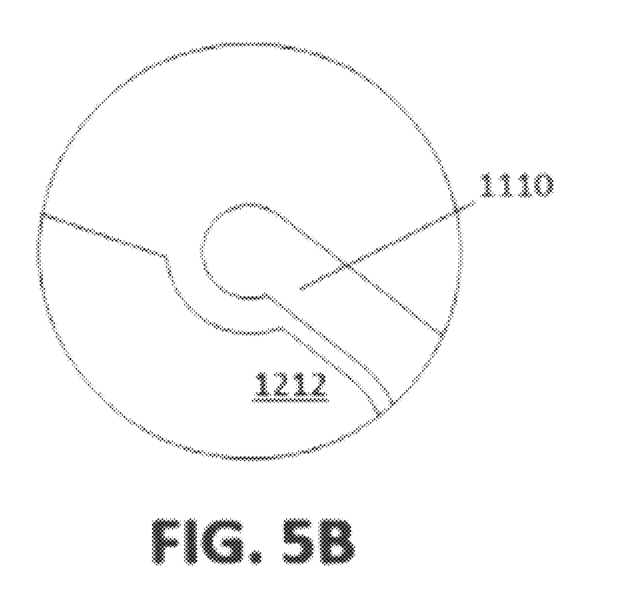
FIG. 5B is a detailed view of the coupling of the hopper and plate of FIG. 5A.

With reference to FIGS. 1, 4 and 5 to 5B, the configuration of the hopper 1200, which has a substantially oval shape, is shown, said hopper 1200 comprises at its lower end a plurality of fins 1210 evenly distributed along the entire periphery of said hopper, wherein said fins 1210 have a substantially trapezoidal shape with a semicircular projection 1211 on the lower side and an edge 1212 on the tip or free end of each fin. Said semicircular projection 1211 reduces the food waste by pitching of the birds. As shown in FIGS. 5A and 5B, said edge 1212 has the function of being inserted into the internal coupling groove 1111 of the plate and providing a firm and rigid coupling between the plate 1100 and the hopper 1200 so that these do not disengage during the washing with pressure water of the feeder 1000.

Said hopper further comprises two inclined side walls 1220 which extend from the upper wall to substantially the half of the peripheral wall height. Each of said side walls 1220 comprises a plurality of openings or windows 1221 which allow access to the interior of the hopper, so that when the feeder 1000 is washed the water jet can enter into the hopper 1200 and plate 1100 to wash the food accumulated inside thereof, thereby avoiding contamination of the feeder and the generation of diseases in animals. Said hopper comprises in its upper wall 1230 a central hole surrounded by concave lateral reinforcement ridges 1233 and front and rear planes ridges 1234, and openings or windows 1232 located adjacent to the lateral ends of said upper wall 1230, wherein said openings or windows 1232 have the same function as the windows 1221 of the side walls.

Figure 6:
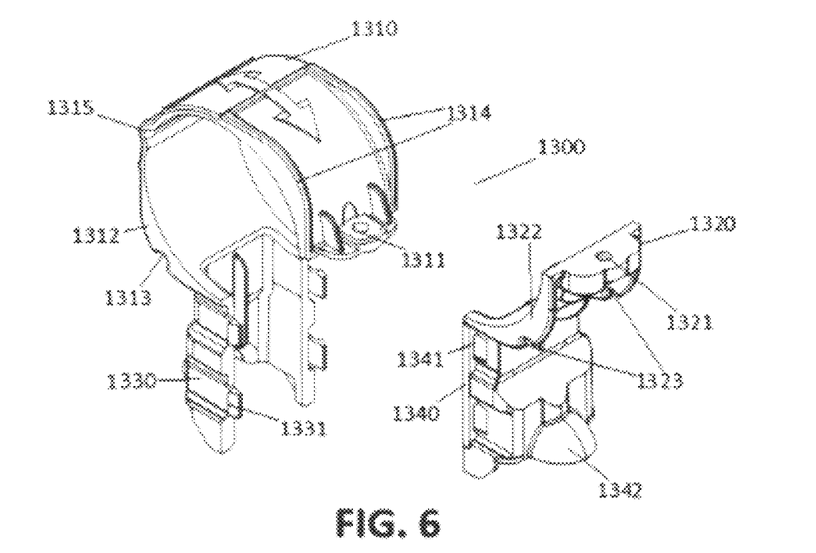
FIG. 6 is a perspective view of the circular flange of the poultry feeder with double direction of rotation of the present invention.
Figure 7:
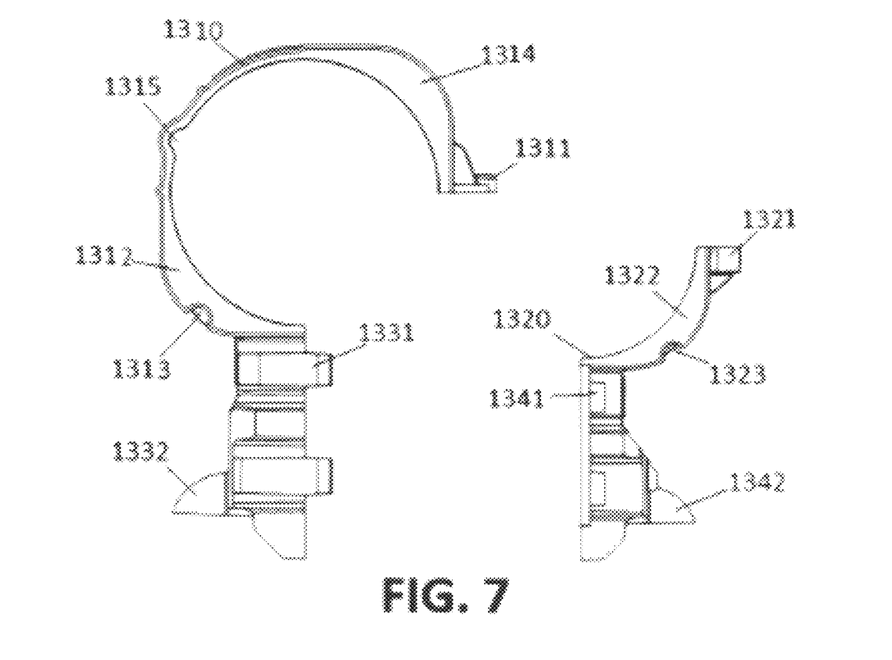
FIG. 7 is a front view of the flange of FIG. 6.

As shown in FIGS. 1, 6 and 7, the positioning flange 1300 is formed by an open circular section divided into two parts, a holding part 1310, and a fixing part 1320, wherein said holding 1310 and fixing 1320 parts comprise free lateral ends 1311, 1321 which releasably engage each other by screw and nut or the like. Likewise, said holding 1310 and fixing 1320 parts of said flange 1300 comprise in its lower part a hollow throat of substantially square cross section, which is also conformed by two parts left 1330 and right 1340, wherein the left part 1330 it is integrally attached to the holding part 1310 and the right part 1340 is integrally attached to the fixing part 1320, so that when the holding 1310 and fixing 1320 parts of the flange are coupled, the right and left parts of the throat form a conduit for the passage of food to the hopper 1200. Said throat is narrower in the section adjacent to the circular section and wider in its lower section, wherein said narrow section facilitates the introduction and coupling of the two parts 1330, 1340 of the throat into the central hole 1231. On the other hand, the wider section of the throat allows that once coupled said left 1330 and right 1340 parts prevents the flange 1300 from decoupling from the hopper 1200, whereby said flange 1300 can be compressed or extended from said hopper 1200.

As shown in FIGS. 6 and 7, the left part 1330 of the throat comprises notched male coupling elements 1331 which are inserted into female coupling elements 1341 of the right part such as cavities, by means of a snap fit. Likewise, each of said right 1340 and left 1330 parts of the throat, comprises a semicircular lateral projection or stop at its lower end 1332, 1342, which together with the wider section of the throat prevent the flange 1300 from decoupling of the hopper 1200, since when the throat extends, these impact with the inner face of the semicircular side ridges 1233 of the central hole 1231 of the upper wall 1230 of the hopper 1200.

With reference again to FIGS. 6 and 7 it can be appreciated that the holding part 1310 of the flange comprises upper 1314 and lower 1312 reinforcing ears on its front and rear faces and a hinge 1315 that allows a greater opening capacity of the circular section of the flange 1300. Likewise, the fixing part 1320 of the flange comprises reinforcing ears 1322 on its front and rear faces, wherein as can be seen the lower front ear of the holding part 1310 and the front ear of the fixing part 1320 comprises a semicircular cut-out 1313, 1323 configured to receive a securing element.

Referring now to FIGS. 1, 8, 9 and 10, the components of the clamp 1400 are shown, wherein said clamp is formed by two semicircular halves or in the form of half-round lower 1410 and upper 1420, wherein each of said halves 1410, 1420 is divided into three sections: front, central and rear by peripheral reinforcing ridges 1411, 1421. The lower half 1410 comprises at the left ends of the front and rear sections T-shaped coupling elements 1412, and at the right ends of the front and rear sections a holes 1413 with a box for receiving a nut, sheave or the like. Said lower half 1410 further comprises inside thereof a pair of longitudinal grooves or channels 1414 spaced apart at about 45°, to be coupled to welded or flanged tubes in any sense without having to flip the feeder 1000. Said lower half further comprises in its central section a through hole 1415 for receiving food and a sliding tab 1430, which slides through said peripheral ridges 1411 and on a groove 1416 which is located on the outer surface of said lower half below said peripheral ridges 1411. Each of said peripheral ridges 1411 comprises a guide rim 1417 on the inner face thereof, wherein said guide rims 1417 have the function of allowing sliding of the cylindrical section of the flange thereon. Said tab 1430 is formed by a curved plate having at its rear end a through hole 1431 that allows the passage of food into the flange 1300 and the hopper when the hole 1431 is coincident with the central through hole 1415, and gripping means on the front end thereof, which is conformed by side ears 1432 having orifices for inserting the user's fingers and a lower flap 1433, said gripping means permits manipulation of the tab to slide and in this way open or close the feed passage of the feeding tube to the interior of the feeding feeder 1000.

Figure 8:
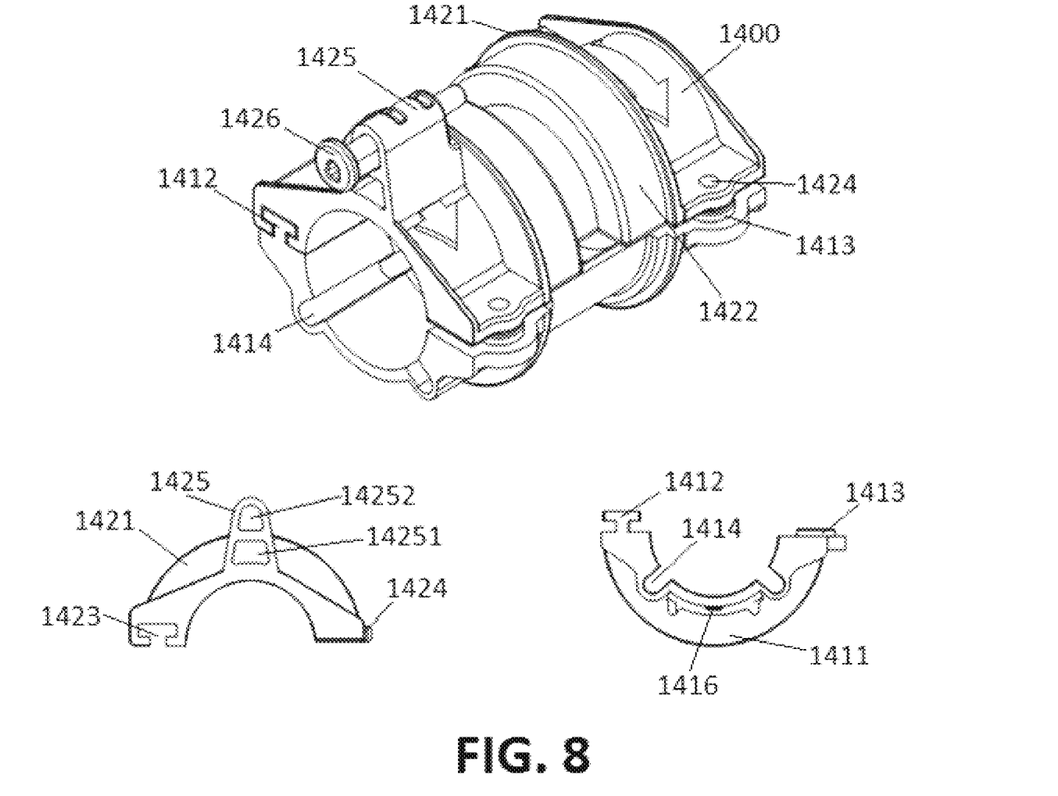
FIG. 8 is a series of exploded perspective and front views of the poultry feeder with double sense of rotation of the present invention.
Figure 9:
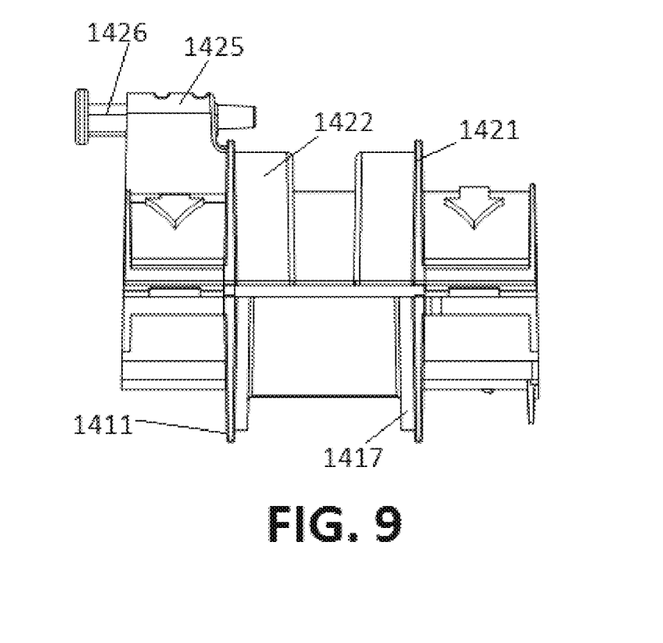
FIG. 9 is a front view of the assembled bracket of FIG. 8.
Figure 10:
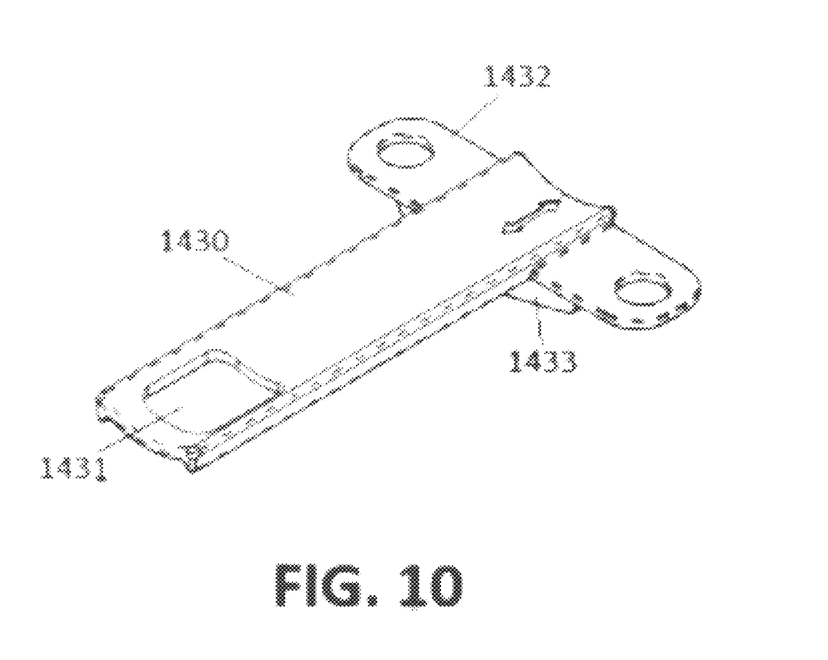
FIG. 10 is a perspective view of the tongue of the clamp.

The upper half 1420 of said clamp 1400 comprises reinforcing ridges 1421 which divide said upper half in said three sections and these in turn comprise guide rims 1422 which as the guide rims 1417 have the function of allowing the sliding of the cylindrical section of the flange thereon. Said upper half further comprises at the left ends of the front and rear sections T-shaped coupling grooves 1423, which are configured to slidably engage with the T-shaped coupling elements 1412, likewise, said upper half 1420 comprises at the right ends of the front and rear sections a hole 1424 which is configured to engage with the holes 1413 and ensure the coupling of the upper 1420 and lower 1410 halves of said clamp by means of nut and screw or the like. Said upper half 1420 further comprises in its front section retaining and coupling means of the securing element 1425, which has two through holes, a lower retaining hole 14251 of the securing element 1426, and an upper retaining hole 14252 of the securing element 1426, wherein said securing element 1426 refers to a bolt, shank, bushing or the like.

In accordance with the above, when the feeder is rotated, either clockwise or counter-clockwise, to be placed in its resting or washing position at about 160° or 70°, depending on the sense in which it is turned, that is to say, if it is rotated clockwise it would be 70° and when it is turned counter-clockwise it would be 160°, said feeder is held and secured in said position by means of said securing element 1426, by rotating the circular section 1310 of flange 1300 on the guide rims 1417, 1422 of the central section of the clamp, so that the upper retaining hole 14252 of said securing means 1425 coincides with the respective semicircular cutout 1313, 1323 of the right or left reinforcing ear of said flange 1300 according to the sense in which the feeder is rotated, and by inserting said securing element 1426 through the upper retaining hole 14252 and said respective semicircular cutout 1313, 1323

Figure 11:
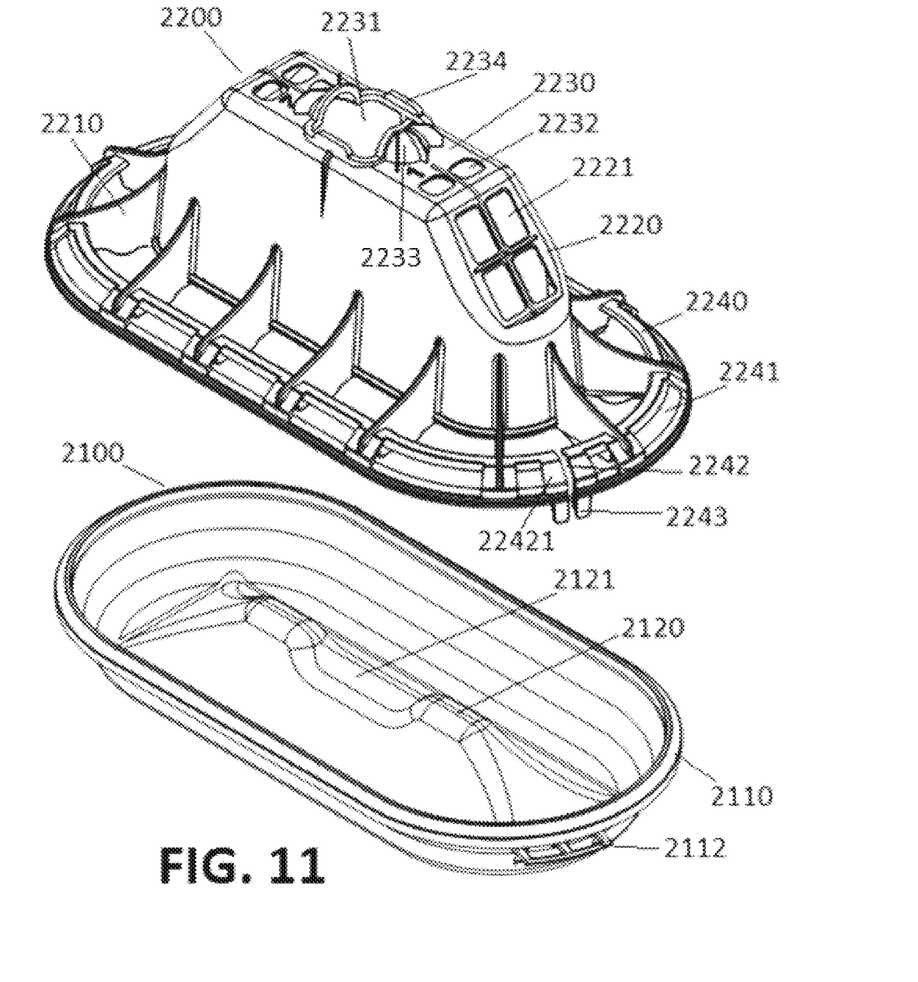
FIG. 11 is a perspective view of a second embodiment of the poultry feeder with double sense of rotation of the present invention.
Figure 12:
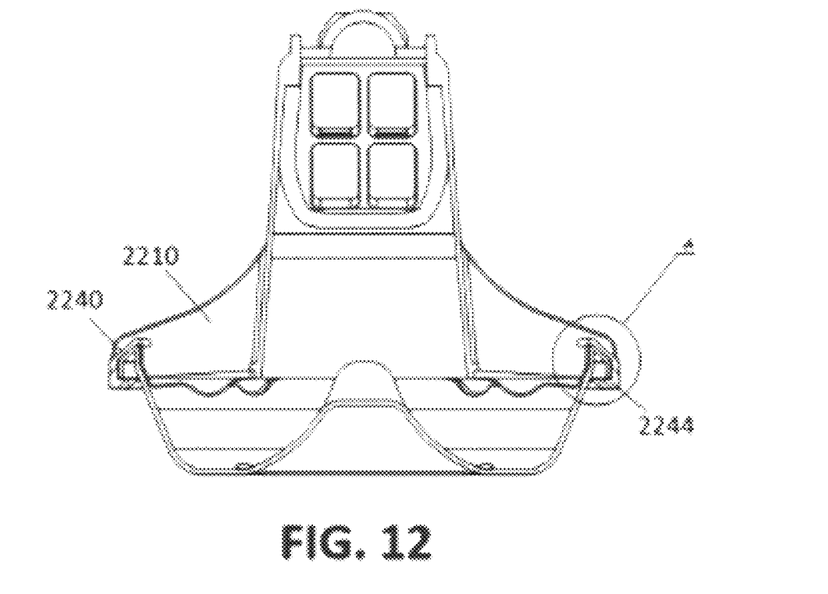
FIG. 12 is a cross sectional view of the coupling of the hopper and plate of the second embodiment of the poultry feeder with double sense of rotation of the present invention.
Figure 13:
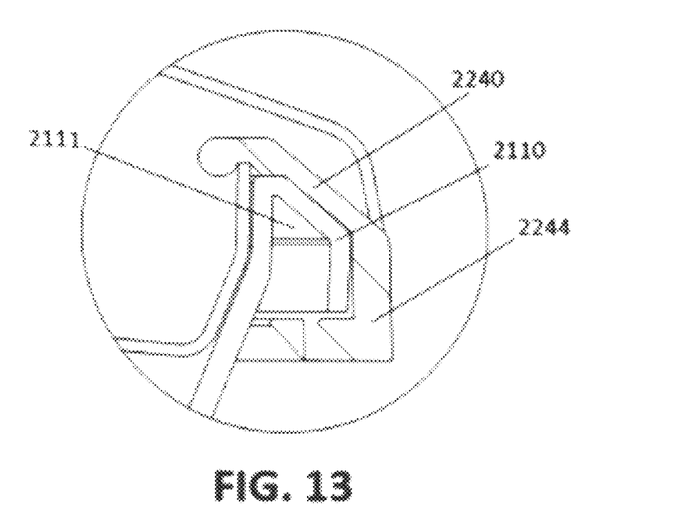
FIG. 13 is a detailed view of the coupling of the hopper and plate of FIG. 12.

Referring now to FIGS. 11 to 13, a second embodiment 2000 of the poultry feeder with double sense of rotation of the present invention is shown, wherein said feeder 2000 is similarly formed as the feeder 1000 of the first embodiment by a food receiving plate 2100; a hopper 2200; a positioning flange 2300 and a holding clamp 2400.

As shown in FIGS. 11 to 13, the food receiving plate 2100 of the second embodiment as well as the plate 1100 has a rounded rectangular shape or a rectangular shape with its rounded corners and a substantially conical peripheral wall, integrally joined to a bottom wall. Said plate 1100 comprises at the upper end of its peripheral wall an outwardly curved peripheral ridge 2110, which forms an external coupling groove 2111. Said peripheral ridge 2110 comprises at one of its corners two laterally extending fitting projections 2112. Said plate 2100 further comprises in its interior a central longitudinal hump 2120 which comprises a depression 2121 in the center thereof with a flat surface, said depression 2121 has the function of uniformly distributing the food throughout the plate, which falls thereon from hopper 2200.

As shown in FIGS. 11 and 12, the configuration of the hopper 2200 is shown, which has a substantially oval shape, said hopper 2200 comprises at its lower end a plurality of trapezoidal fins 2210 evenly distributed along the entire periphery of said hopper, joined at its free end by a grid 2240, wherein between each pair of fins there is a window 2241. Said grid 2240 has a substantially curved or concave shape with a coupling hook 2244 at its end which is configured to be fixedly engaged on the peripheral ridge 2110 as shown in FIG. 13 so that when coupled they are seen as a single element, since the ridge 2110 covers the windows 2241. Said grid comprises at one of its corners a release opening 2242 which divides the respective window into two releasing sections 22421. Said release opening 2242 allows the hopper to be released from the plate by pulling one of the two releasing sections 22421, with which the plate and the hopper are quickly and easily uncoupled without effort. Each of said releasing sections 22421 comprises, in alignment with the fitting projections 2112, an insertion projection 2243, which engage said fitting projections 2112 to secure the hopper 2200 to the plate 2100.

The hopper 2200 further comprises two inclined side walls 2220 which extend from the upper wall to substantially half the height of the peripheral wall. Each of said lateral walls 2220 comprises a plurality of openings or windows 2221 which allow access to the interior of the hopper, so that when the feeder 2000 is washed the water jet can enter into the hopper 1200 and plate 2100 to wash the food accumulated therein, thereby avoiding contamination of the feeder and the generation of diseases in animals. Said hopper comprises in its upper wall 2230 a central hole 2231 surrounded by concave lateral reinforcement ridges 2233 and front and rear planes ridges 2234, and openings or windows 2232 located adjacent to the lateral ends of said upper wall 2230, wherein said openings or windows 2232 have the same function as the windows 2221 of the side walls.

The positioning flange 2300 and the holding clamp 2400, of the second embodiment are exactly the same as the flange 1300 and the clamp 1400 of the first embodiment, so they will not be described.

It will be apparent to a person skilled in the art that the double-directional configuration of the feeders 1000 and 2000 of the present invention allows the feeders in an automated farm to be placed in a single position, and that the weight of the same can be uniformly distributed when they are positioned in their resting or washing position, since with this new configuration, only one feeder is rotated clockwise and another anti-clockwise, thus preventing the tube from slipping and misaligning the orifices of food distribution of the tube from the central holes 1415 2415 of the clamps 1300 and 2300 of said feeders.

Likewise, the position of 160° or 70°, of the feeders in their washing position prevents said feeders from colliding or interfering with the anti-perching cable, in addition, the inclusion of the edges in the fins and the inner coupling slot of the plate allows the hopper and the plate not to disengage when they are washed with pressure water.

Likewise, the new configuration of the tongue allows it to be manipulated manually or by means of a suitable tool to reduce the operating time.

According to the previous description, it will be evident to a person skilled in the art that the poultry feeder with double sense of rotation described above is presented for illustrative purposes only, since a person skilled in the art can make numerous variations thereof, as long as it is designed in accordance with the principles of the present invention. As a consequence of the foregoing, the present invention includes all the embodiments that a person skilled in the art can propose based on the concepts contained in the present description, in accordance with the following claims.

The invention claimed is:

1. A poultry feeder with double-directional rotation, comprising:
   a substantially rounded rectangular plate with an upper ridge forming a coupling slot;
   a hopper having a plurality of lower fins with an edge at a tip and which are configured to be inserted into the coupling slot, a plurality of side and upper openings to allow internal washing, and an upper hole with lateral reinforcements;
   a circular flange having lateral ends that couples releasably, in its lower part a substantially square hollow throat with projections or stops at its lower end, wherein said flange and throat are divided into two parts to be inserted into said upper hole in said hopper and are held therein by said projections or stops, and wherein said flange comprises at its lower part right and left reinforcing ears each having a semicircular cutout; and
   a substantially cylindrical clamp conformed by an upper and lower half, each in the shape of a half-round, wherein each of said upper and lower halves is divided into three sections front, central and rear, by peripheral ridges, wherein the lower half comprises an orifice for receiving food in the central section, wherein said upper half comprises in its front section retaining and coupling means of a securing element; and a T-shaped curved tongue that slides through said peripheral ridges and over a groove in an outer surface of said lower half, wherein said tongue comprises adjacent to its rear end a through hole, and at its front end a tongue gripping media for better handling thereof, wherein said tongue has the function of opening and closing the passage of food through the food receiving orifice, wherein when the feeder is rotated, either clockwise or counter-clockwise, to be placed in its resting or washing position at approximately 160° or 70°, depending on the direction in which it is turned, said feeder is maintained and secured in said position by means of said securing element, by rotating the flange on the central section of the clamp, so that said retaining and coupling means coincides with the respective semicircular cutout of the right or left reinforcing ear of said flange according to the direction in which the feeder is rotated and inserting said securing element through said retaining and coupling means and semicircular cutout.

2. The poultry feeder with double-directional rotation according to claim 1, wherein said plate comprises a central longitudinal hump which further comprises a depression in the center thereof with a flat surface, which has the function of uniformly distributing the food throughout the plate.

3. The poultry feeder with double-directional rotation according to claim 1, wherein said fins further comprise a semicircular projection on its lower side which reduces the food waste by pitching of the birds.

4. The poultry feeder with double-directional rotation according to claim 1, wherein the coupling groove and the edges of the fins provide a firm and rigid coupling between the plate and the hopper so that they do not disengage during washing with pressure water of the feeder.

5. The poultry feeder with double-directional rotation according to claim 1, wherein said throat is narrower in its upper section and wider in its lower section, wherein said narrow section facilitates the introduction and coupling of the two parts of the throat into the upper hole.

6. The poultry feeder with double-directional rotation according to claim 5, wherein said wider section of the throat once coupled prevents the two parts of the throat of the flange from decoupling from the hopper, so that said flange can be compressed or extended from said hopper.

7. The poultry feeder with double-directional rotation according to claim 1, wherein said lower half further comprises a pair of longitudinal grooves or channels spaced apart at approximately 45° that are to be attached to tubes with a seam or rim in any sense so as not to have to flip the feeder.

8. The poultry feeder with double-directional rotation according to claim 1, wherein said tongue gripping media is formed by lateral ears that have holes for the insertion of the fingers of the user and a lower wing.

9. The poultry feeder with double-directional rotation according to claim 8, wherein said lateral ears and lower wing allow the tongue to be manipulated manually or by a suitable tool to reduce the operating time.

10. The poultry feeder with double-directional rotation according to claim 1, wherein said flange additionally comprises a hinge that allows a greater opening capacity of the circular section of the flange.

11. A poultry feeder with double-directional rotation, characterized in that comprises:
a substantially rounded rectangular plate with an outwardly curved peripheral ridge forming a coupling slot;
a hopper comprising a plurality of lower fins joined at their free end by a grid, wherein said grid has a substantially concave shape with a coupling hook at its end configured to be fixedly coupled on the peripheral ridge to form a single element; wherein said grid comprises in one of its corners a release opening that forms two releasing sections, which allows the hopper to be released from the plate by pulling one of the two releasing sections, with which the plate and the hopper are quickly and easily uncoupled without effort; said hopper further comprises a plurality of side and upper openings to allow internal washing, and an upper hole with lateral reinforcements;
a circular flange having lateral ends that couple releasably in its lower part a substantially square hollow throat with projections or stops at its lower end, wherein said flange and throat are divided into two parts to be inserted into said upper hole in said hopper and are held therein by said projections or stops, and wherein said flange comprises at its lower part right and left reinforcing ears each having a semicircular cutout; and
a substantially cylindrical clamp conformed by an upper and lower half each in the shape of a half-round, wherein each of said upper and lower halves is divided into three sections front, central and rear, by peripheral ridges, wherein the lower half comprises an orifice for receiving food in the central section; wherein said upper half comprises in its front section retaining and coupling means of securing element; and a T-shaped curved tongue that slides through said peripheral ridges and over a groove in an outer surface of said lower half, wherein said tongue comprises adjacent to its rear end a through hole, and at its front end a tongue gripping media for better handling thereof, wherein said tongue has the function of opening and closing the passage of food through the food receiving orifice, wherein when the feeder is rotated, either clockwise or counter-clockwise, to be placed in its resting or washing position at approximately 160° or 70°, depending on the direction in which it is turned, said feeder is maintained and secured in said position by means of said securing element, by rotating the flange on the central section of the clamp, so that said the retaining and coupling means coincides with the respective semicircular cutout of the right or left reinforcing ear of said flange according to the sense in which the feeder is rotated and inserting said securing element through said retaining and coupling means and semicircular cutout.

12. The poultry feeder with double-directional rotation according to claim 11, wherein said peripheral ridge comprises at one of its corners two laterally extending fitting projections; and wherein each of said releasing sections comprises, an insertion projection, which engage said fitting projections to secure the hopper to the plate.

13. The poultry feeder with double-directional rotation according to claim 11, wherein said plate comprises in its interior a central longitudinal hump which further comprises a depression in the center thereof with a flat surface, which has the function of uniformly distributing the food throughout the plate.

14. The poultry feeder with double-directional rotation according to claim 11, wherein said throat is narrower in its upper section and wider in its lower section, wherein said narrow section facilitates the introduction and coupling of the two parts of the throat into the upper hole.

15. The poultry feeder with double-directional rotation according to claim 14, wherein said wider section of the throat once coupled prevents the two parts of the throat the flange from decoupling from the hopper, so that said flange can be compressed or extended from said hopper.

16. The poultry feeder with double-directional rotation according to claim 11, wherein said lower half further comprises a pair of longitudinal grooves or channels spaced apart at approximately 45°, that are to be attached to tubes with seam or rim in any sense so as not to have to flip the feeder.

17. The poultry feeder with double-directional rotation according to claim 11, wherein said tongue gripping media is conformed by lateral ears that have holes for the insertion of the fingers of the user and a lower wing.

18. The poultry feeder with double-directional rotation according to claim 11, wherein said flange additionally comprises a hinge that allows a greater opening capacity of the circular section of the flange.

\* \* \* \* \*